United States Patent [19]
Ohki

[11] Patent Number: 5,838,985
[45] Date of Patent: Nov. 17, 1998

[54] PARALLEL PROCESSOR WITH MEMORY/ALU INHIBITING FEATURE

[75] Inventor: Mitsuharu Ohki, Tokyo, Japan

[73] Assignee: Sony Corporation, Japan

[21] Appl. No.: 604,246

[22] Filed: Feb. 21, 1996

[30] Foreign Application Priority Data

Feb. 24, 1995 [JP] Japan .................................. 7-035764

[51] Int. Cl.[6] ................................................ G06F 15/16
[52] U.S. Cl. .............................. 395/800.16; 395/800.17; 395/800.22; 395/379; 395/564
[58] Field of Search ........................ 395/800.16, 800.17, 395/800.22, 800.1, 379, 382, 391, 390, 564, 565

[56] References Cited

U.S. PATENT DOCUMENTS

| | | | |
|---|---|---|---|
| 4,992,933 | 2/1991 | Taylor ................................ | 395/800.22 |
| 5,163,120 | 11/1992 | Childers et al. .................... | 395/800.15 |
| 5,241,637 | 8/1993 | Skruhak et al. ..................... | 395/388 |
| 5,542,074 | 7/1996 | Kim et al. ........................... | 395/800.22 |
| 5,638,533 | 6/1997 | Law ..................................... | 395/484 |

OTHER PUBLICATIONS

Jesshope et al; "Design of SIMD microprocessor array"; IEEE proceedings vo. 136, No. 3, May 1989.
SVP: Serial Video Processor/Proceedings of the IEEE 1990 Custom Integrated Circuits Conference/P. 17.3.1 to 4.

Primary Examiner—Meng-Ai T. An
Attorney, Agent, or Firm—Ronald P. Kananen

[57] ABSTRACT

A parallel processor comprises a data input register, a plurality of processor elements, a data output register, control means and instruction signal generating means. The data input register is for receiving a plurality of first data composed of serial data and outputting the first data as parallel data. The plurality of processor elements are for performing prescribed arithmetic operations on the first data as parallel data and outputting a plurality of arithmetically-processed second data. The data output register is provided with the plurality of second data as parallel, and outputs the second data as serial data. The control means jointly controls the operating states of the plurality of processor elements. The instruction signal generating means is for generating instruction signals instructing inhibiting of the prescribed arithmetic operations occurring at each of the processor elements on the basis of pre-defined arithmetic conditions for the prescribed arithmetic processes for the processor elements. Here, the prescribed arithmetic operations for the plurality of processor elements are inhibited in accordance with the instruction signals.

5 Claims, 7 Drawing Sheets

FIG. 7 input data number

FIG. 8

PARALLEL PROCESSOR WITH MEMORY/ALU INHIBITING FEATURE

BACKGROUND OF THE INVENTION

The present invention relates to a parallel processor for processing data inputted in parallel used when performing digital processing etc. on image signals.

Processing devices such as, for example, that shown in "SVP: SERIAL VIDEO PROCESSOR/Proceedings of the IEEE 1990 CUSTOM INTEGRATED CIRCUITS CONFERENCE/P.17.3.1 to 4" are well known as devices for digitally processing image signals.

Figure 1:
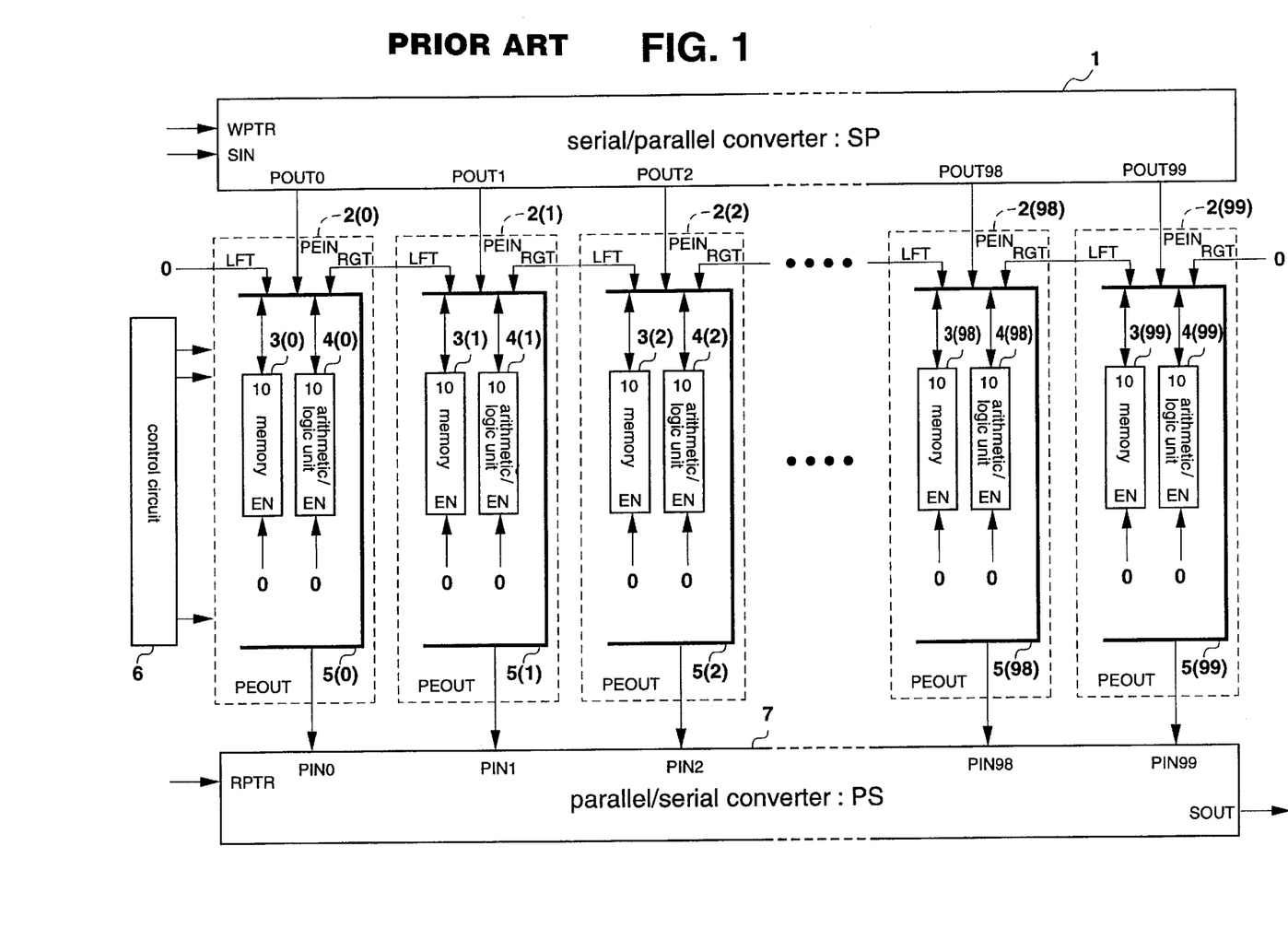
FIG. 1 is a block diagram showing a related parallel processor.

These devices are constructed using, for example, the kind of parallel processors shown in detail in FIG. 1.

A description of the aforementioned related device will be given with reference to FIG. 1. In FIG. 1, for example, image signals for each pixel constructed from a plurality of bits are provided serially in word (pixel) units. Each word provided is then stored in a serial/parallel converter (hereinafter referred to as an "SP") having memory m for one horizontal period (1H). In this example, m=100. The m items of data stored in SP 1 are then outputted from m parallel data output terminals POUT0 to POUTm−1.

The m items of data outputted from the parallel data output terminals POUT0 to POUTm−1 are inputted to m corresponding processing elements PE 2(0) to PE 2(m−1). Each PE 2(i) (i=0 to m−1) then has a memory 3(i) and an arithmetic/logic unit (hereinafter referred to as "ALU") 4(i). The desired arithmetic operations are then carried out using control signals from a control circuit 6.

Here, the memory 3(i) and the ALU 4(i) of each PE 2(i) are always in an operating state. i.e. "0" is always being inputted to the enable terminals of PE 2(0) to PE 2(99) and ALU 4(0) to ALU 4(99). The enable is on when "0" is inputted to the enable terminal and off when a "1" is inputted.

Further, wiring is provided so that each PE 2(i) can send and receive data to and from the neighboring PE 2(i−1) and PE 2(i+1) under the control of the control circuit 6.

After the desired arithmetic operation has been carried out at PE 2(0) to PE 2(m−1), m items of data representing the results are inputted to m parallel data input terminals PIN0 to PINm−1 of a parallel/serial converter PS 7 having memory (m) for one horizontal period (1H). The data inputted in parallel via the parallel data input terminals PIN0 to PINm−1 is then converted to serial word (pixel) units and serially outputted in word (pixel) units from serial data output terminals.

In this device, data for each pixel of the image signal provided to the SP 1 every horizontal period is stored in PE 2(i) within the subsequent horizontal blanking period. Arithmetic processes are then carried out on this data stored in PE 2(i) at the ALU within PE 2(i) within the next one horizontal period. The arithmetically processed data within PE 2(i) is then inputted to PS 7 within the following horizontal blanking period and an arithmetically-processed image signal is therefore captured for each horizontal period. The digital processing of signals such as image signals is thus carried out.

Further, there is only one control circuit 6 for controlling the arithmetic processes at PE 2(0) to PE 2(m−1) and this is shared by all m of the PE's, i.e. the processing device in FIG. 1 is of an Single Instruction Multiple Data (hereinafter referred to as "SIMD") method parallel processor construction where the number of processor elements is the same as the data number (m) for one horizontal period.

With video signal processing, it is often the case that the same arithmetic process is carried out for all of the pixels. The SIMD method where the same processing instructions are given to all of the processor elements is therefore sufficiently compatible so as not to provide inconvenience. The fact that there is only one control circuit in the SIMD method provides the added benefit of keeping the circuit small.

However, with the circuit structure in FIG. 1, the control circuit 6 controls all of PE 2(0) to 2(99) using a common control signal. If a calculation is then to be carried out for a number of PE's (hereinafter referred to as a first group of PE's), even if it is not necessary to perform the calculation for the remaining PE's (hereinafter referred to as the second group of PE's), an instruction to perform the desired calculation is sent from the control circuit 6. This means that the desired calculation is carried out at the second group of PE's as well as at the first group of PE's, with the values calculated at the second group of PE's then being ignored.

This is to say that because the processing device employing a parallel processor adopts an SIMD method, calculations that are not necessary are carried out for the second group of PE's and this makes the amount of power consumed excessive.

As the present invention sets out to resolve the above situation, its object is to provide a parallel processor capable of carrying out processing in an efficient manner by selectively processing groups of data inputted in parallel using a simple structure.

SUMMARY OF THE INVENTION

In order to achieve the aforementioned object, according to the present invention, a parallel processor comprises a data input register, a plurality of processor elements, a data output register, controller and instruction signal generator. The data input register is for receiving a plurality of first data composed of serial data and outputting the first data as parallel data. The plurality of processor elements are for performing prescribed arithmetic operations on the first data as parallel data and outputting a plurality of arithmetically-processed second data. The data output register is provided with the plurality of second data as parallel data, and outputs the second data as serial data. The controller jointly controls the operating states of the plurality of processor elements. The instruction signal generator is for generating instruction signals instructing inhibiting of the prescribed arithmetic operations occurring at each of the processor elements on the basis of pre-defined arithmetic conditions for the prescribed arithmetic processes for the processor elements. Here, the prescribed arithmetic operations for the plurality of processor elements are inhibited in accordance with the instruction signals.

Each of the plurality of processor elements comprises an arithmetic unit for carrying out the prescribed arithmetic operations, memory for temporarily storing data before and after arithmetic processing, and a register for storing the instruction signals generated by the instruction signal generator. Further, the controller controls reading and writing of information between the arithmetic unit, the memory and the register.

Moreover, the instruction signal generator generates a first instruction signal for inhibiting the operation of the memory and a second instruction signal for inhibiting the operation of the arithmetic unit. Still further, the plurality of processor elements are equipped with a first register for storing the first instruction signals and a second register for storing the second instruction signal.

Further, according to the present invention, a parallel processor comprises a data input register, a plurality of processor elements, a data output register and controller. The data input register is for receiving a plurality of first data composed of serial data and outputting the first data as parallel data. The plurality of processor elements are for performing prescribed arithmetic operations on the first data as parallel data and outputting a plurality of arithmetically-processed second data. Each of the plurality of processor elements comprises an arithmetic unit for carrying out the prescribed arithmetic operations and a memory for temporarily storing data before and after arithmetic processing. The data output register is provided with the plurality of second data as parallel data, and outputs the second data as serial data. The controller is for jointly controlling operating states of the plurality of processor elements. The controller reads out data stored in the memory within the processor elements before arithmetic processing and generates instruction signals instructing the inhibiting of operation of each of the processor elements on the basis of pre-defined arithmetic conditions for the prescribed arithmetic processes for the arithmetic units. The prescribed arithmetic processes for the plurality of processor elements are inhibited in accordance with the instruction signals.

Still further, each of the plurality of processor elements have registers for storing the generated instruction signals and the controller controls writing and reading of information between the arithmetic units, the memory and the registers.

In the present invention, the operating states of the controller, memory and arithmetic unit are controlled by the parallel processor. The structure is therefore simple and processing can be carried out in an efficient manner by selectively processing groups of data inputted in parallel.

DETAILED DESCRIPTION OF THE PREFERRED EMBODIMENTS

First Embodiment

The following is a description with reference to the drawings of an embodiment of the present invention.

Figure 2:
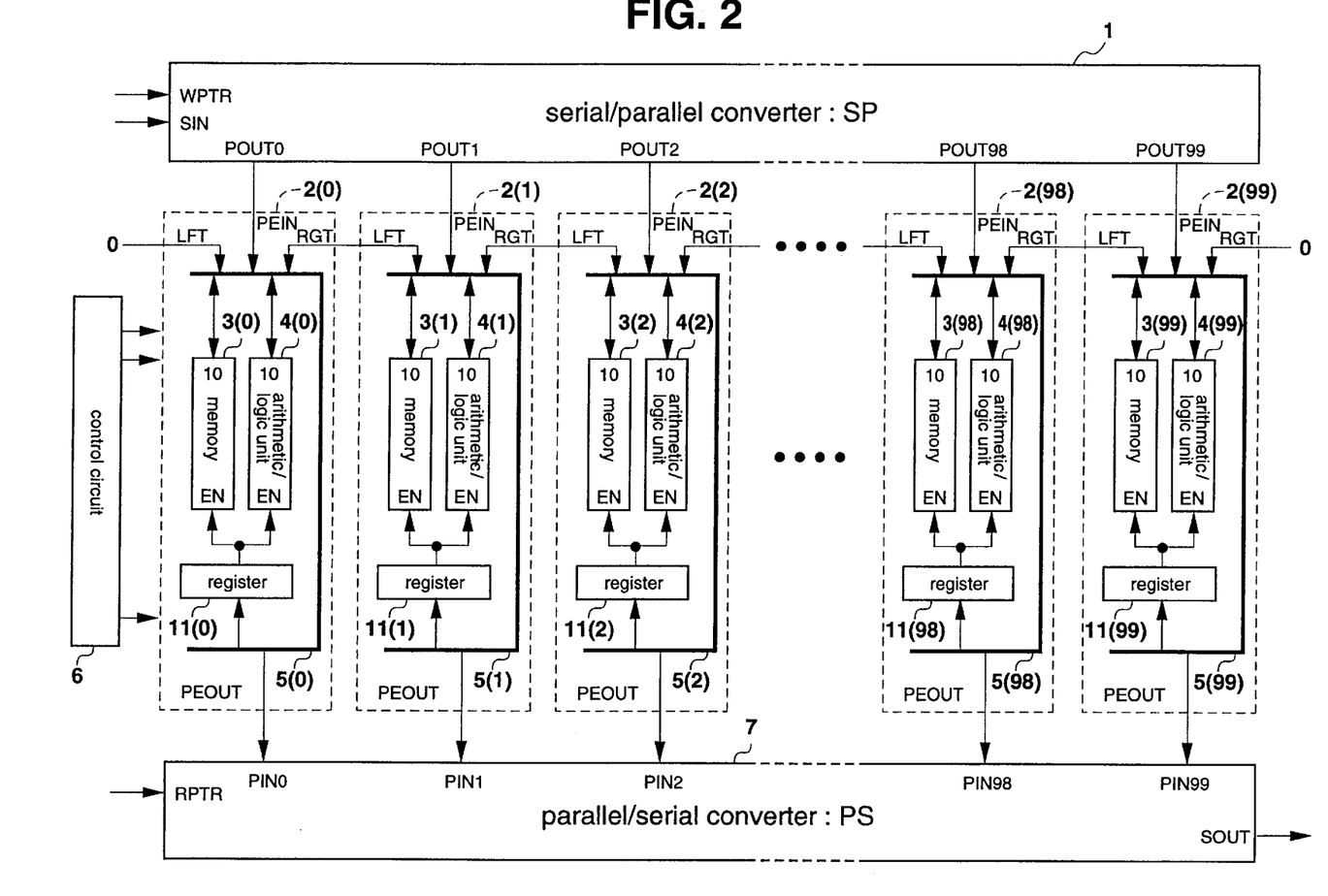
FIG. 2 is a block diagram showing a first embodiment of a parallel processor of the present invention.
Figure 3:
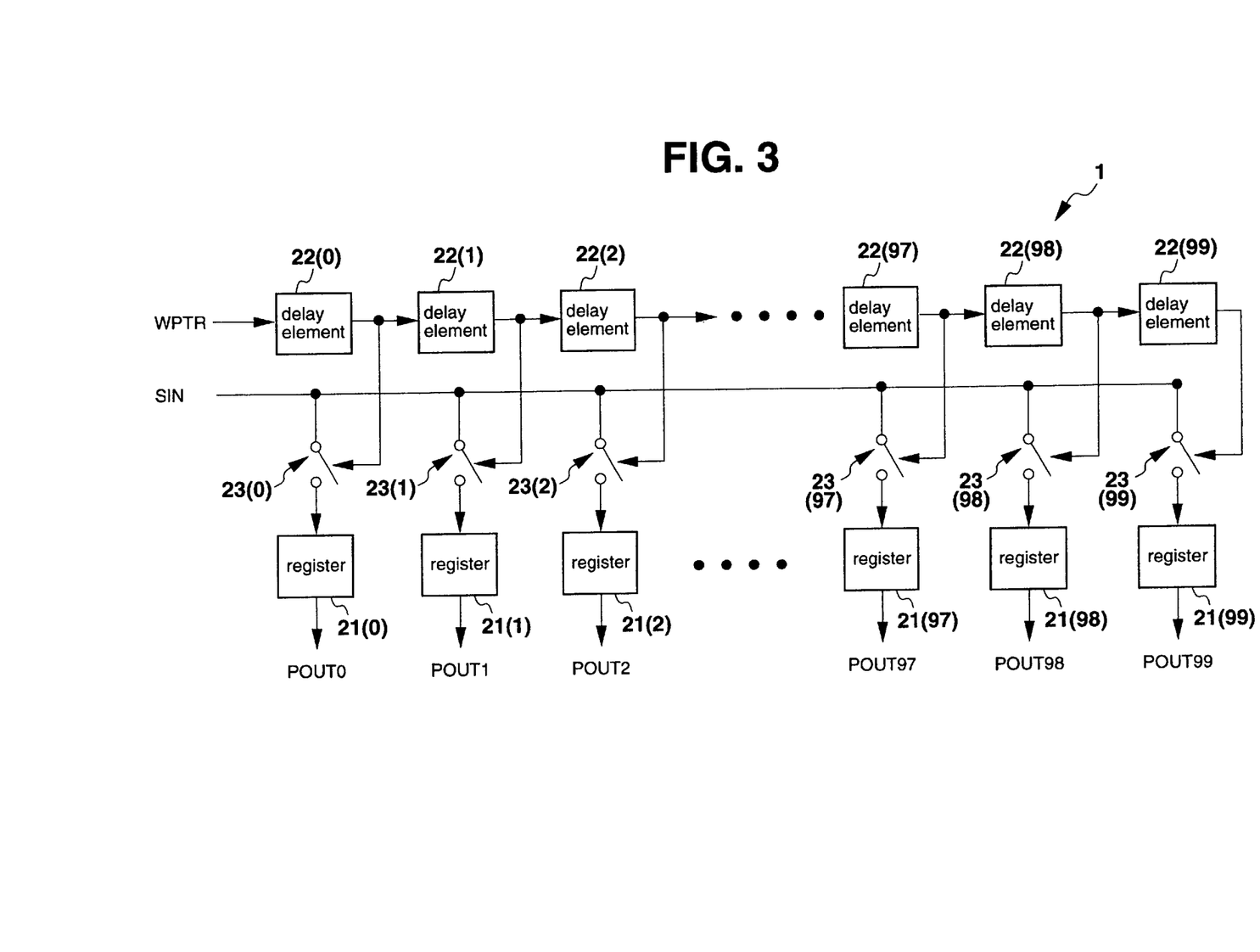
FIG. 3 is a block diagram showing the serial/parallel converter SP of FIG. 2.
Figure 4:
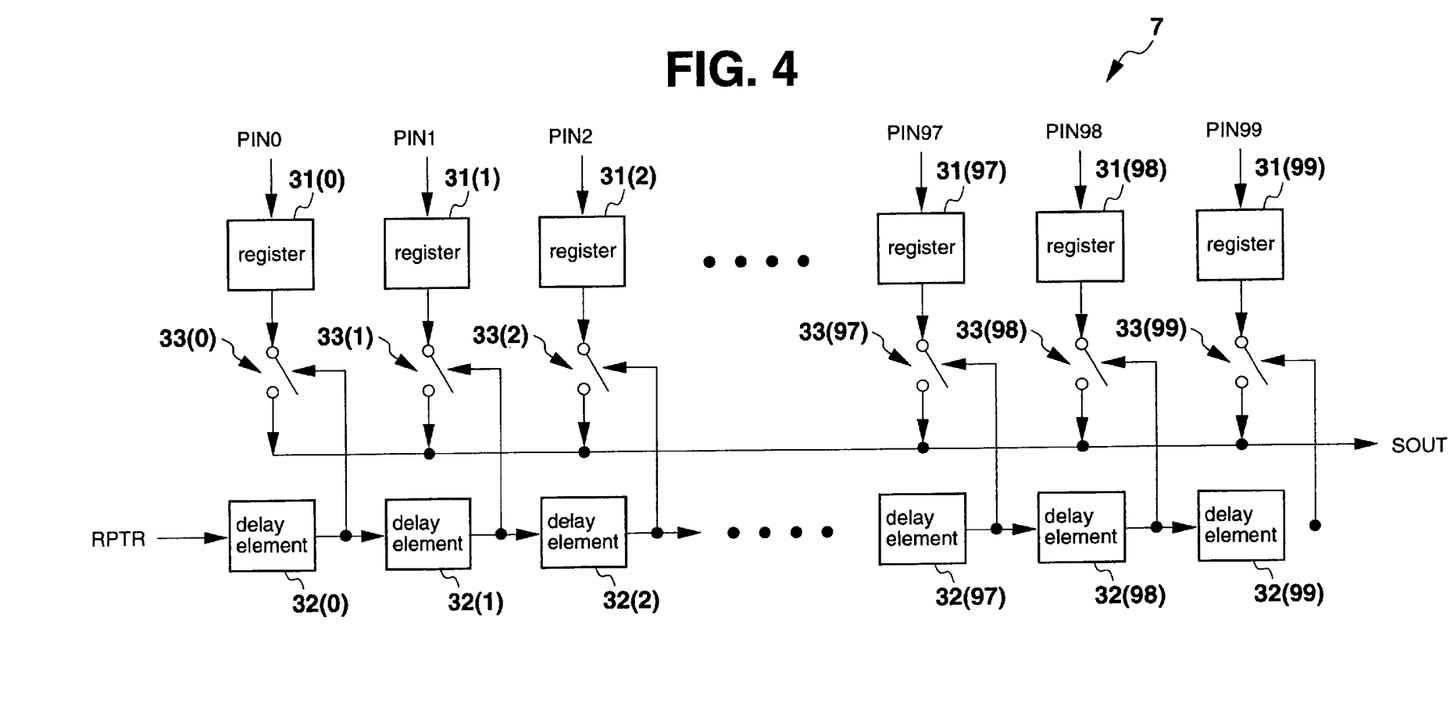
FIG. 4 is a block diagram showing the parallel/serial converter PS of FIG. 2.
Figure 5:
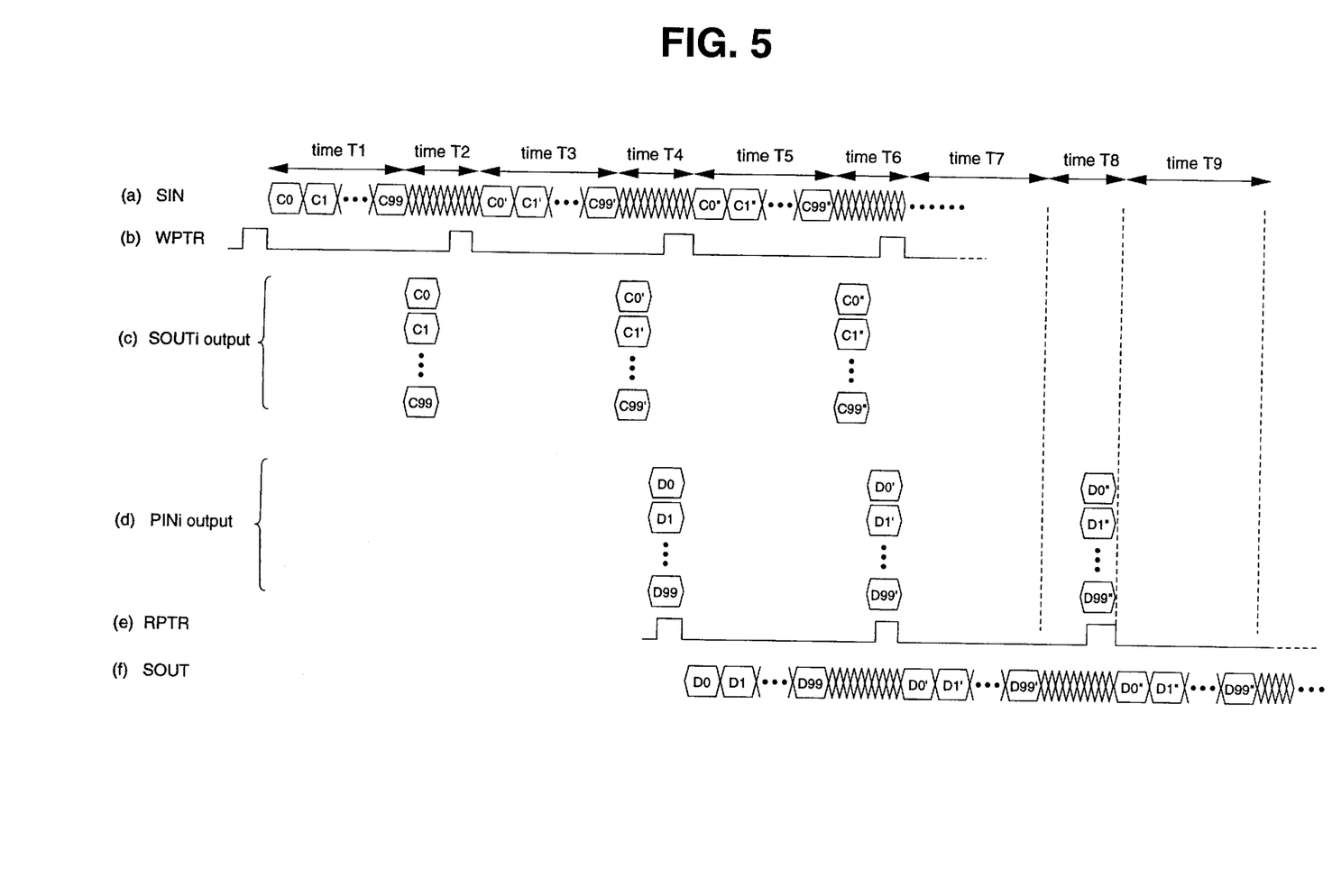
FIG. 5 is a diagram explaining the signal timing of the parallel processor of FIG. 2.
Figure 6:
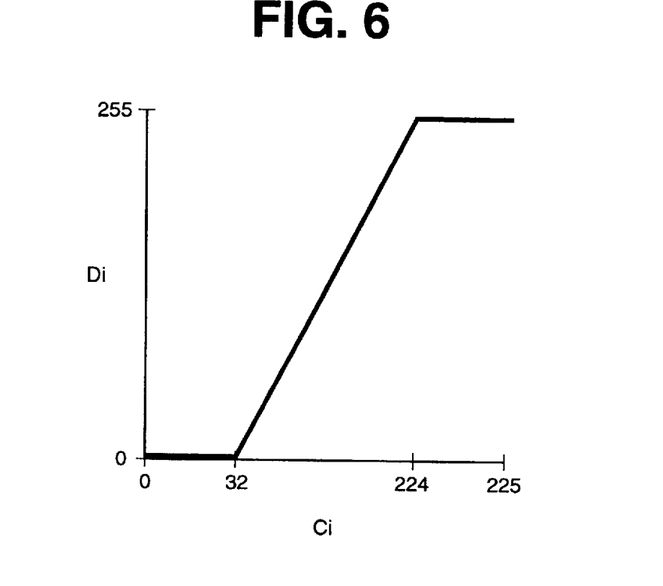
FIG. 6 is a first diagram explaining a process at a processor element PE of FIG. 2.

FIGS. 2 to 7 show a first embodiment of the present invention. FIG. 2 is a block diagram showing a parallel processor. FIG. 3 is a block diagram showing the SP (serial/parallel converter) of FIG. 2. FIG. 4 is a block diagram showing the PS (parallel/serial converter) of FIG. 2. FIG. 5 is a diagram describing the signal timing of the parallel processor of FIG. 2. FIG. 6 is a first diagram explaining the process at the processor element PE of FIG. 2. FIG. 6 is a second diagram explaining the process at the PE of FIG. 2.

In FIG. 2, the number of the processing systems is taken as 100 for simplicity. The number of the processing systems is usually equal to the number of items of data in one horizontal scanning period, and as such is usually a few hundreds to a few thousands.

In FIG. 2 showing the parallel processor of this embodiment, numeral 1 indicates a serial/parallel converter (hereinafter referred to as "SP"). As shown in FIG. 3, registers 21(0) to 21(99), one bit unit delay elements 22(0) to 22(99) and switches 23(0) to 23(99) are present within SP 1, with the delay elements 22(0) to 22(99) being connected in series. An "on" signal from a write pointer input terminal (hereinafter referred to as a "WPTR") can then be sequentially transmitted via the delay elements 22(0), 22(1), 22(2), ..., 22(99).

Switches 23(i) are present at the input part of the register 21(i) (i=0 to 99). If the switches 23(i) are made to go on, data from the serial data input terminal (hereinafter referred to as SIN) is stored in the registers 21(i). The outputs of the delay elements 22(i) are used as the "on" signals for the switches 23(i).

Returning to FIG. 2, the numerals 2(0) to 2(99) represent processor elements (hereinafter referred to as "PE's") encompassed by the dotted lines. Each PE 2(i) (i=0 to 99) is constructed from memory 3(i) and an arithmetic/logic unit (hereinafter referred to as "ALU") 4(i). The outputs of registers 21(i) in the SP 1 are inputted to PE 2(i) via parallel data output terminals i (hereinafter referred to as POUTi). Items of data C0, C1, C2, ..., C99 serially inputted to the SIN are respectively inputted to PE 2(0), PE 2(1), PE 2(2), ..., PE 2(99) by applying an "on" signal to WPTR.

Items of data Ci (i=0 to 99) from the SP 1 are stored in each memory 3(i) via the input terminals (hereinafter referred to as PEIN) of each PE 2 (i). Desired calculations are carried out on data stored in the memory 3(i) by the arithmetic/logic units (ALU's) 4(i). At this time, data can be transferred to or from the neighboring PE's PE 2(i−1) and PE 2(i+1) via input/output terminals LFT and RGT, if deemed necessary. Here, LFT is a terminal for sending and receiving data to and from PE 2(i−1) and RGT is a terminal for sending and receiving data to and from PE 2 (i+1). Further, numeral 5(i) represents a bus that links together the memory 3(i), the ALU 4(i) and each of the terminals PEIN, PEOUT, LFT and RGT.

Registers 11(0) to 11(99) are provided at each of PE 2(0) to PE 2(99). The outputs of these registers 11(0) to 11(99) are applied as enable signals to memory 3(0) and ALU 4(0) through to memory 3(99) and ALU 4(99). The registers 11(i) (i=0 to 99) can also take data from the bus 5(i). Further, each of the registers 11(i) (i=0 to 99) are cleared by a common clear signal, which is not shown in the diagram, from the control circuit 6, i.e. "0" is installed simultaneously in all of the registers 11(0) to 11(99) using a clear signal from the control circuit 6.

Control of PE 2(i) during these arithmetic/logic processes is carried out by the control circuit 6.

Each of the data items Di which are the results calculated by each PE 2(i) (i=0 to 99) is outputted from the output terminals (hereinafter referred to as "PEOUT") to be inputted to the parallel data input terminals i (hereinafter referred to as "PINi") of the parallel/serial converter (hereinafter abbreviated to "PS") 7.

Inside PS 7 there are registers 31(0) to 31(99), one bit delay elements 32(0) to 32(99) and switches 33(0) to 33(99). The delay elements 32(0) to 32(99) are connected together in series, with an "on" signal from the read pointer input terminal (hereinafter referred to as RPTR) being sequentially transmitted through delay elements 32(0), 32(1), 32(2), . . . , 32(99).

Items of data Di inputted via PINi (i=0 to 99) are stored temporarily in the registers 31(i). Switches 33(i) are provided at the output part of the registers 31(i) and the data Di stored in the registers 31(i) is outputted from the serial data output terminals (hereinafter referred to as SOUT) when these switches 33(i) are made to go on.

The outputs of the delay elements 32(i) (i=0 to 99) are used as "on" signals for the switches 33(i). The data D0, D1, D2, . . . , D99 are then outputted serially from SOUT by applying an "on" signal to RPTR.

The timing of this operation will be described using FIG. 5.

The image signal shown as (a) is provided word (pixel)-serially from the SIN of SP 1 (time T1). Immediately before the initial image signal data for the first horizontal scanning period are inputted, as "on" signal shown as (b) is inputted from the WPTR of SP 1. In this way, the initial input data C0 is stored in the register 21(0) because the "on" signal is sent to the delay element 22(0) and the switch 23(0) goes on in synchronous with the initial input data C(0). The next input data C1 is then stored in register 21(1) because the "on" signal is then sent to the delay element 22(1) and the switch 23(1) goes on in synchronous with the next data C1. In the same way, input data C2 to C99 are then stored in registers 21(2) to 21(99), i.e. the data for a single horizontal scanning period (1H) is stored in register 21(0) to 21(99).

Then, within the following blanking period (time T2) the data items C0 to C99 stored in registers 21(0) to 21(99) are provided to PE 2(0) to PE 2(99) via POUT0 to POUT99 of SP 1 in the way shown as (c).

The desired arithmetic/logic operations are then performed during the following single horizontal scanning period (time T3). This is to say that in the time T2, each PE 2(i) (i=0 to 99) stores the received data Ci in the memory 3(i). Then, in the time T3, these data are read out from the memory 3(i) and arithmetic/logic operations are carried out by the ALU 4(i). The results Di of these operations are then stored again in the memory 3(i). The process is controlled by the control circuit 6. The details of these operations are described later.

The operation results D0 to D99 shown as (d) are then provided to the registers 31(0) to 31(99) within the PS 7 via PIN0 to PIN99 of PS 7 during the subsequent horizontal blanking period (time T4).

An "on" signal shown as (e) is then inputted from RPTR of PS 7 immediately before the one horizontal scanning period (time T5) following the above storing. In this way, the operation result data D0 stored in the register 31(0) is outputted from SOUT because the "on" signal is sent to delay element 32(0) and the switch 33(0) goes on first. Then, the switch 33(1) goes on because the "on" signal is then sent to the delay element 32(1) and the operation result data D1 stored in register 31(1) is outputted from SOUT after the resulted data D0. The operation result data D2 to D99 stored in registers 31(2) to 31(99) are then outputted from SOUT in the same manner. That is, the operation result data for a single horizontal scanning period (1H) is outputted word (pixel)-serially from SOUT in the form shown as (f).

The same operation is also carried out for the following data C0' to C99' which is delayed by a single horizontal scanning period, as well as for the subsequent data C0'' to C99'' which is delayed by a further horizontal scanning period, i.e. the desired operations are carried out and the resulting data D0' to D99' and D0'' to D99'' are outputted.

Next, the arithmetic/logic processes at the arithmetic logic circuit are described using two example processes.

Initially, a description will be given using a first example process. The first example process is a process where the contrast of inputted image data is emphasized before being outputted.

That is, as shown in FIG. 6, where the horizontal axis represents the input data value Ci and the vertical axis represents the output data value Di, if the input data Ci is less than 32, the output data Di is outputted as "0", and if Ci is 32 or more and less than 224, the output data Di is outputted as $(256/192) \times (Ci-32)$. Further, if Ci is 224 or more, the output data Di is outputted as 255.

First, a clear signal is sent from the control circuit 6 to registers 11(0) to 11(99). In this way, the memory 3(i) and the ALU 4(i) within each PE 2(i) (i=0 to 99) are enabled to be in operation.

As shown in FIG. 5, the input data C0, C1, C2, . . . , and an "on" signal are inputted from the SIN and WPTR of SP 1. These input data Ci (i=0 to 99) are then provided to memory 3(i) of PE 2(i) via the POUTi of the SP, the PEIN of PE 2(i) and the bus 5(i) of the PE 2(i). The details of this operation are described above, and are therefore omitted here.

These data Ci are then stored in address zero of the memory 3(i) of each PE 2(i) (i=0 to 99). In this way, the values shown in the following Table 1 are stored in address zero of each memory 3(i), where C0=20, C1=80, C2=240, C3=104, C4=30 and C5=250.

TABLE 1

|  | PE 2(0) | PE 2(1) | PE 2(2) | PE 2(3) | PE 3(4) | PE 2(5) | ... |
|---|---|---|---|---|---|---|---|
| Address 0 | C0 = 20 | C1 = 80 | C2 = 240 | C3 = 104 | C4 = 30 | C5 = 250 | ... |
| Address 1 | 0 | 1 | 1 | 1 | 0 | 1 | ... |
| Address 2 | 1 | 0 | 1 | 0 | 1 | 1 | ... |
| Address 3 | 1 | 1 | 0 | 1 | 1 | 0 | ... |
| Address 4 | D0 = 0 | $D1 = \frac{256}{192}(C1-32) = 64$ | D2 = 255 | $D3 = \frac{256}{192}(C3-32) = 96$ | D4 = 0 | D5 = 255 | ... |

The values Ci at address 0 of the memory 3(i) of each PE 2(i) (i=0 to 99) are then read out and supplied to the ALU 4(i). If the value Ci is then determined at ALU 4(i) that this value is less than 32, a data "0" is stored in address 1 of memory 3(i), and a data "1" is stored if this is determined not to be the case (refer to address 1 of Table 1). This is, of course, carried out under instructions from the control circuit 6.

The values Ci at address 0 of the memory 3(i) of each PE 2(i) (i=0 to 99) are then read-out again and provided to the ALU 4(i). If this value is determined at the ALU 4(i) to be equal to or greater than 32 and less than 224, a data "0" is then written at address 2 of memory 3(i), and a data "1" is written if this is determined not to be the case (refer to address 2 of Table 1). This is, of course, also carried out under instructions from the control circuit 6.

Next, the values Ci at address 0 of the memory 3(i) of each PE 2(i) (i=0 to 99) are again read out and provided to the ALU 4(i). If this value is determined to be 224 or greater, a data "0" is then written at address 3 of memory 3(i), and a data "1" is written if this is determined not to be the case (refer to address 3 of table 1). This is, of course, also carried out under instructions from the control circuit 6.

Next, the values of the address 1 of the memory 3(i) of each PE 2(i) (i=0 to 99) are written to the registers 11(i) via the buses 5(i) under instructions from the control circuit 6.

In this way, "0" is written to the register 11(0) of PE 2(0) and the register 11(4) of PE 2(4) etc., and "1" is written to the register 11(1) of PE 2(1), the register 11(2) of PE 2(2), the register 11 of PE 2(3) and the register 11(5) of PE 2(5) etc. in accordance with Table 1.

The memory 3(0) and the ALU 4(0) of PE 2(0), and the memory 3(4) and the ALU 4(4) of PE 2(4) etc. therefore enter operating states. Further, the memory 3(1) and the ALU 4(1) of PE 2(1), the memory 3(2) and the ALU 4(2) of PE 2(2), the memory 3(3) and the ALU 4(3) of PE 2(3), and the memory 3(5) and the ALU 4(5) of PE 2(5) etc. enter a sleep state.

An instruction to write "0" to address 4 of the memory 3(i) of each PE 2(i) (i=0 to 99) is then given from the control circuit 6. In this way, "0" is written to address 4 of the memory 3(0) of PE 2 (0) and to address 4 of the memory 3(4) of PE 2(4) etc.

However, the memory 3(1) of PE 2(1), the memory 3(2) of PE 2(2), the memory 3(3) of PE 2(3) and the memory 3(5) of PE 2(5) etc. are in a sleep state. These memories therefore ignore instructions from the control circuit 6 and no data can be written to them. This means that the power consumption at this time is low because PE 2(1), PE 2(2), PE 2(3) and PE 2(5) etc. are not operating.

Next, a clear signal is sent to the registers 11(0) to 11(99) from the control circuit 6. This means that the memory 3(i) and the ALU 4(i) of each of the PE 2(i) (i=0 to 99) are enabled to be in operation.

Next, the values of the address 2 of each of the memory 3(i) (i=0 to 99) are written to the registers 11(i) via the bus 5(i) under instruction from the control circuit 6.

In this way, "0" is written to the register 11(1) of PE 2(1), and the register 11(3) of PE 2(3), and "1" is written to the register 11(0) of PE 2(0), the register 11(2) of PE 2(2), the register 11(4) of PE 2 (4) and the register 11(5) of PE 2(5) etc., in accordance with Table 1.

The memory 3(1) and the ALU 4(1) of PE 2(1), and the memory 3(3) and the ALU 4(3) of PE 2(3) etc. therefore enter an operating state. Further, the memory 3(0) and the ALU 4(0) of PE 2(0), the memory 3(2) and the ALU 4(2) of PE 2(2), the memory 3(4) and the ALU 4(4) of PE 2(4), and the memory 3(5) and the ALU 4(5) of PE 2(5) etc. enter a sleep state.

The data Ci at the address 0 of the memory 3(i) of each PE 2 (i) (i=0 to 99) are then read-out and provided to the ALU 4(i). The calculation $(256/192) \times (C_i - 32)$ is then performed at the ALU 4(i) and an instruction is given to write the results to the address 4. In this way, the arithmetic results at the ALU 4(1) or 4(3) etc. are written to address 4 of the memory 3(1) of PE 2(1) and the memory 3(3) of PE 2(3) etc. However, the memory 3(0) of PE 2(0), the memory 3(2) of PE 2(2), the memory 3(4) of PE 2(4) and the memory 3(5) of PE 2(5) are all in a sleep state and therefore no data can be written to them because instructions from the control circuit 6 are ignored. Power consumption can therefore be kept low at this time because PE 2(0), PE 2(2), PE 2(4) and PE 2(5) are not in operation.

Next, a clear signal is sent to the registers 11(0) to 11(99) from the control circuit 6. This means that the memory 3(i) and the ALU 4(i) of each of the PE 2(i) (i=0 to 99) are enabled to be in operation.

Next, the values of the address 3 of each of the memory 3(i) (i=0 to 99) are written to the registers 11(i) via the bus 5(i) under instruction from the control circuit 6.

In this way, "0" is written to the register 11(2) of PE 2(2), and the register 11(5) of PE 2(5), and "1" is written to the register 11(0) of PE 2(0), the register 11(1) of PE 2(1), the register 11(3) of PE 2(3) and the register 11(4) of PE 2(4) etc., in accordance with table 1.

The memory 3(2) and the ALU 4(2) of PE 2(2), and the memory 3(5) and the ALU 4(5) of PE 2(5) etc. therefore enter an operating state. Further, the memory 3(0) and the ALU 4(0) of PE 2(0), the memory 3(1) and the ALU 4(1) of PE 2(1), the memory 3(3) and the ALU 4(3) of PE 2(3), and the memory 3(4) and the ALU 4(4) of PE 2(4) etc. enter a sleep state.

An instruction to write 255 to the address 4 of the memory 3(i) of each PE 2(i) (i=0 to 99) is then given from the control circuit 6 so that 255 is written to the address 4 of the memory 3(2) of PE 2(2) and the address 4 of memory 3(5) of PE 2(5) etc. However, the memory 3(0) of PE 2(0), the memory 3(1) of PE 2(1), the memory 3(3) of PE 2(3) and the memory 3(4) of PE 2(4) etc. are in a sleep state and therefore no data can be written to them because instructions from the control circuit 6 are ignored. Power consumption is also kept low because PE 2(0), PE 2(1), PE 2(3) and PE 2(4) etc. are not in operation at this time.

Next, a clear signal is sent to the registers 11(0) to 11(99) from the control circuit 6 so as to enable the memory 3(i) and the ALU 4 (i) of each PE 2(i) (i=0 to 99) to be in operation.

In this way, the data Di as the desired operation results are written to address 4 of the memory 3(i) for each PE 2(i) (refer to address 4 of Table 1).

The output data Di (i=0 to 99) written in the address 4 are provided to PINi of PS 7 via bus 5(i) and PEOUTi of PE 2(i). The data D0, D1, D2, D3, . . . is then outputted from SOUT of PS 7 in that order. The details of this operation are described above and will therefore be omitted here (refer to FIG. 5).

Conventionally, the calculations for the three cases of the data Ci

[1] less than 32

[2] 32 or more and less than 224, and

[3] 224 or more are carried out at all of the processing elements regardless of the values for the items of data Ci inputted at each processor element because all of the processor elements are always in an operating state with only necessary results then being selected. That is, two of the three aforementioned calculations are unnecessary in each processor and are not used after calculating. A large amount of power is therefore uselessly consumed as a result of these unnecessary calculations.

In the first example process of this embodiment, the value given to the register 11(i) is made to be "1" in some processor elements for which calculations are unnecessary and memory 3(i) and ALU 4(i) in the processor elements enter a sleep state. Instructions from the control circuit 6 can therefore be ignored and power consumption can be kept low.

Next, a description of the present invention will be given using a second example process. In this example process, a region representing one horizontal scanning period with respect to the inputted image data is divided into three equal portions and the data in each portion is specially processed before being outputted. That is, of the input data C0 to C99 for a single horizontal scanning period, the data C0 to C32 is forcibly taken as 0, the data C33 to C65 is divided by 2, and the data C66 to C99 is outputted without modification.

Figure 7:
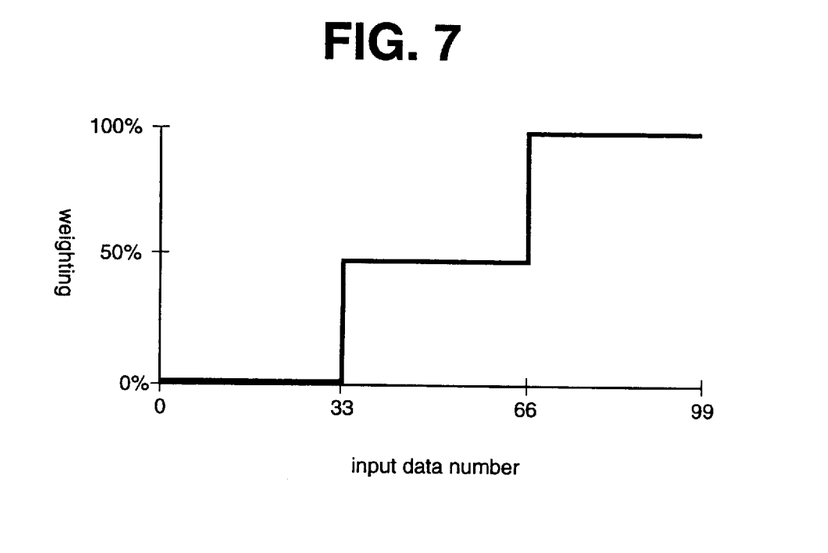
FIG. 7 is a second diagram explaining a process at the processor element PE of FIG. 2.

The relationship of the output data with respect to this input data is shown in FIG. 7. The horizontal axis of FIG. 7 represents the input data number and the vertical axis represents the multiplication weighting for this data.

First, a clear signal is sent to registers 11(0) to (99) from the control circuit 6. In this way, the memory 3(i) and the ALU 4(i) of each PD 2(i) (i=0 to 99) are enabled to be in operation.

Then, the input data C0, C1, C2, . . . and an "on" signal are respectively inputted from the SIN and WPTR of SP 1. However, "0" are inputted on the high order bit side of the data inputted to the SIN of SP 1 at the same time as the data C0 to C32 are inputted, "1" are inputted on the high order bit side of the data inputted to the SIN of SP 1 at the same time as the data C33 to C65 are inputted, and "2" are inputted on the high order bit side of the data inputted to the SIN of the SP 1 at the same time as the data C66 to C99 are inputted. That is, 0, . . . , 0, 1, . . . , 1, 2, . . . , 2 are inputted in that order on the high order side of the data inputted to the SIN at the same time as the C0, . . . , C32, C33, . . . , C65, C66, . . . , C99 are sequentially inputted on the low order side of the data inputted to SIN. In other words, the groups of [0 and C0] . . . [0 and C32], [1 and C33] . . . [1 and C65], [2 and C66] . . . [2 and C99] are sequentially inputted to the SIN.

These groups of input data Ci(i=1 to 99) and [0, 1 or 2] are provided to the memory 3(i) of PE 2(i) via the buses 5(i) for the POUTi of SP 1, the PEIN of PEi and PEi. The details of this operation are described above and shall be omitted here (refer to FIG. 5).

The data "0", "1" or "2" is stored at address 0 of the memory 3(i) in each PE 2(i). In this way, a data value of "0", "1" or "2" is stored in address 0 of the memory 3(i), as shown in Table 2.

The data Ci are stored in the address 1 of the memory 3(i) of each PE 2(i) (i=0 to 99). In this way, the values are stored as shown in the address 1 in Table 2.

Next, the values of the address 0 in the memory 3(i) of each PE 2(i) (i=0 to 99) are read-out and sent to the ALU 4(i). Then, if this value is determined to be "0" at the ALU 4(i), a "0" is then written to address 2 of the memory 3(i) and a "1" is written if this is determined not to be the case (refer to address 2 of Table 2). This operation is of course carried out under instructions from the control circuit 6.

The value of the address 2 of the memory 3(i) of each PE 2(i) (i=0 to 99) are then read out and sent to the ALU 4(i). If it is determined at the ALU 4(i) that this value is "1", then "0" is written to the address 3 of the memory 3(i), with "1" being written if this is not the case (refer to address 3 of Table 2). This operation is of course carried out under instructions from the control circuit 6.

Next, the value of the address 0 of the memory 3(i) of each PE 2(i) (i=0 to 99) are read out and sent to the ALU 4(i). If it is determined at the ALU 4(i) that this value is "2", then "0" is written to the address 4 of the memory 3(i), and "1" is written if this is not the case (refer to address 4 of Table 2). This operation is of course carried out under instructions from the control circuit 6.

Following this, the values of the address 2 of each of the memory 3(i) are written to the registers 11(i) via the buses 5(i) in response to instructions from the control circuit 6. In this way, "0" is written to register 11(0) of PE 2(0) to register 11(32) of PE 2(32), and "1" is written to register 11(33) of PE 2(33) to register 11(65) of PE 2(65), and to register 11(66) of PE 2(66) to register 11(99) of PE 2(99).

The memory 3(0) and ALU 4(0) of PE 2(0) through to the memory 3(32) and ALU 4(32) of PE 2(32) therefore enter an operational state, while the memory 3(33) and the ALU 4(33) of PE 2(33) through to the memory 3(65) and ALU 4(65) of PE 2(65), and the memory 3(66) and ALU 4(66) of PE 2(66) through to the memory 3(99) and ALU 4(99) of PE 2(99) go into sleep state.

An instruction is then given from the control circuit 6 to write "0" in the address 5 of the memory 3(i) of each PE 2(i) (i=0 to 99), so that "0" is written in the address 5 of the memory 3(0) of PE 2(0) to the address 5 of the memory 3(32) of PE 2(32). However, the memory 3(33) of PE 2(33) to the memory 3(65) of PE 2(65) and the memory 3(66) of PE 2(66) to the memory 3(99) of PE 2(99) are in sleep state. No data can therefore be written to these memories because instructions from the control circuit 6 are ignored in the sleep state. The power consumption at this time is therefore kept low because PE 2(33) to PE 2(65) and PE 2(66) to PE 2(99) are not in operation.

Next, a clear signal is sent to the registers 11(0) to 11(99) from the control circuit 6, so that the memory 3(i) and the ALU 4(i) of each PE 2(i) (i=0 to 99) are enabled to be in operation.

TABLE 2

|  | PE 2(0) | PE 2(1) | ... | PE 2(3) | PE 2(3) | PE 2(3) | ... | PE 2(6) | PE 2(6) | PE 2(6) | ... | PE 2(9) |
|---|---|---|---|---|---|---|---|---|---|---|---|---|
| address0 | 0 | 0 | ... | 0 | 1 | 1 | ... | 1 | 2 | 2 | ... | 2 |
| address1 | C0 | C1 | ... | C32 | C33 | C34 | ... | C65 | C66 | C67 | ... | C99 |
| address2 | 0 | 0 | ... | 0 | 1 | 1 | ... | 1 | 1 | 1 | ... | 1 |
| address3 | 1 | 1 | ... | 1 | 0 | 0 | ... | 0 | 1 | 1 | ... | 1 |
| address4 | 1 | 1 | ... | 1 | 1 | 1 | ... | 1 | 0 | 0 | ... | 0 |
| address5 | D0 = 0 | D1 = 0 | ... | D32 = 0 | D33 = C33/2 | D34 = C34/2 | ... | D65 = C65/2 | D66 = C66 | D67 = C67 | ... | D99 = C99 |

Then, the values of the address 3 of each memory 3(i) are written to the register 11(i) via the bus 5(i) under instructions from the control circuit 6. In this way, "0" is written to the register 11(33) of PE 2(33) through to the register 11(65) of PE 2(65), and "1" is written to the register 11(0) of PE 2(0) through to the register 11(32) of PE 2(32), and the register 11(66) of PE 2(66) through to the register 11(99) of PE 2(99).

The memory 3(33) and ALU 4(33) of PE 2(33) through to the memory 3(65) and the ALU 4(65) of PE 2(65) therefore enter an operating state. The memory 3(0) and ALU 4(0) of PE 2(0) through to the memory 3(32) and ALU 4(32) of PE 2(32), and the memory 3(66) and ALU 4(66) of PE 2(66) through to the memory 3(99) and ALU 4(99) of PE 2(99) go into sleep states.

The data Ci at the address 1 of the memory 3(i) of each PE 2(i) (i=0 to 99) are then read out from the control circuit 6 and sent to the ALU 4(i). The ALU 4(i) then performs the calculation Ci/2 and an instruction is given to write the results in address 5. In this way, Ci/2 are written to the address 5 of the memory 3(33) of PE 2(33) through to the address 5 of the memory 3(65) of PE 2(65). However, the memory 3(0) of PE 2(0) to the memory 3(32) of PE 2(32), and the memory 3(66) of PE 2(66) to the memory 3(99) of PE 2(99) go into sleep state. No data can therefore be written to these memories because instructions from the control circuit 6 are ignored. The power consumption can therefore be kept low at this time because PE 2(0) to PE 2(32) and PE 2(66) to PE 2(99) are not in operation.

Next, a clear signal is sent to the registers 11(0) to 11(99) from the control circuit 6 so as to enable the memory 3(i) and ALU 4(i) of each PE 2(i) (i=0 to 99) to be in operation.

Then, the value of the address 4 of each of the memory 3(i) are written to the registers 11(i) via the buses 5(i) in response to instructions sent from the control circuit 6. In this way, "0" is written to the register 11(66) of PE 2(66) through to the register 11(99) of PE 2(99), and "1" is written to the register 11(00) of PE 2(0) through to the register 11(32) of PE 2(32), and the register 11(33) of PE 2(33) through to the register 11(65) of PE 2(65).

The memory 3(66) and ALU 4(66) of PE 2(66) through to the memory 3(99) and ALU 4(99) of PE 2(99) therefore go into operating states, while the memory 3(0) and ALU 4(0) of PE 2(0) through to the memory 3(32) and ALU 4(32) of PE 2(32), and the memory 3(33) and ALU 4(33) of PE 2(33) through to the memory 3(65) and ALU 4(65) of the PE 2(65) go into sleep states.

The data Ci at the address 1 of the memory 3(i) of each PE 2(i) (i=0 to 99) are then read out and an instruction is given to write the read out data Ci to the address 5, so that the data Ci are written to the address 5 of the memory 3(66) of PE 2(66) through to the address 5 of memory 3(99) of PE 2(99). However, the memory 3(0) of PE 2(0) through to the memory 3(32) of PE 2(32), and the memory 3(33) of PE 2(33) through to the memory 3(65) of PE 2(65) are in sleep states. No data therefore can be written to these memories because instructions from the control circuit 6 are ignored. The power consumption can then be kept low at this time because PE 2(0) to PE 2(32) and PE 2(33) to PE 2(65) are not in operation.

Next, a clear signal is sent from the control circuit 6 to register 11(0) to 11(99) so as to enable the memory 3(i) and the ALU 4(i) of each PE 2(i) (i=0 to 99) to be in operation.

The data Di as the desired results of operation are then written to the address 5 of the memory 3(i) of each PE 2(i) (refer to address 5 of Table 2).

The output data Di (i=0 to 99) written to the address 5 are sent to PINi of PS 7 via the buses 5(i) of PE 2(i) and PEOUTi. The data D0, D1, D2, D3, . . . are then sequentially outputted in that order from SOUT of PS 7. The details of this operation have already been described and will therefore be omitted here (refer to FIG. 5).

Conventionally, the following three calculations for the cases of

[1] the first one third within a single horizontal scanning period,

[2] the intermediate one third within a single horizontal scanning period, and

[3] the final one third within a single horizontal scanning period are carried out at all of the processing elements regardless of the values for the items of data Ci inputted at each processor element because all of the processor elements are always in an operating state, with only necessary results then being selected, i.e., two of the three aforementioned calculations are unnecessary in each processor and are not used after calculating. A large amount of power is therefore uselessly consumed as a result of these unnecessary calculations.

In the first example process of this embodiment, the value "1" is given to the register for calculations that are determined to be unnecessary for each processor element so that they are brought into a sleep state. Instructions from the control circuit 6 can therefore be ignored and power consumption can be kept low.

Figure 8:
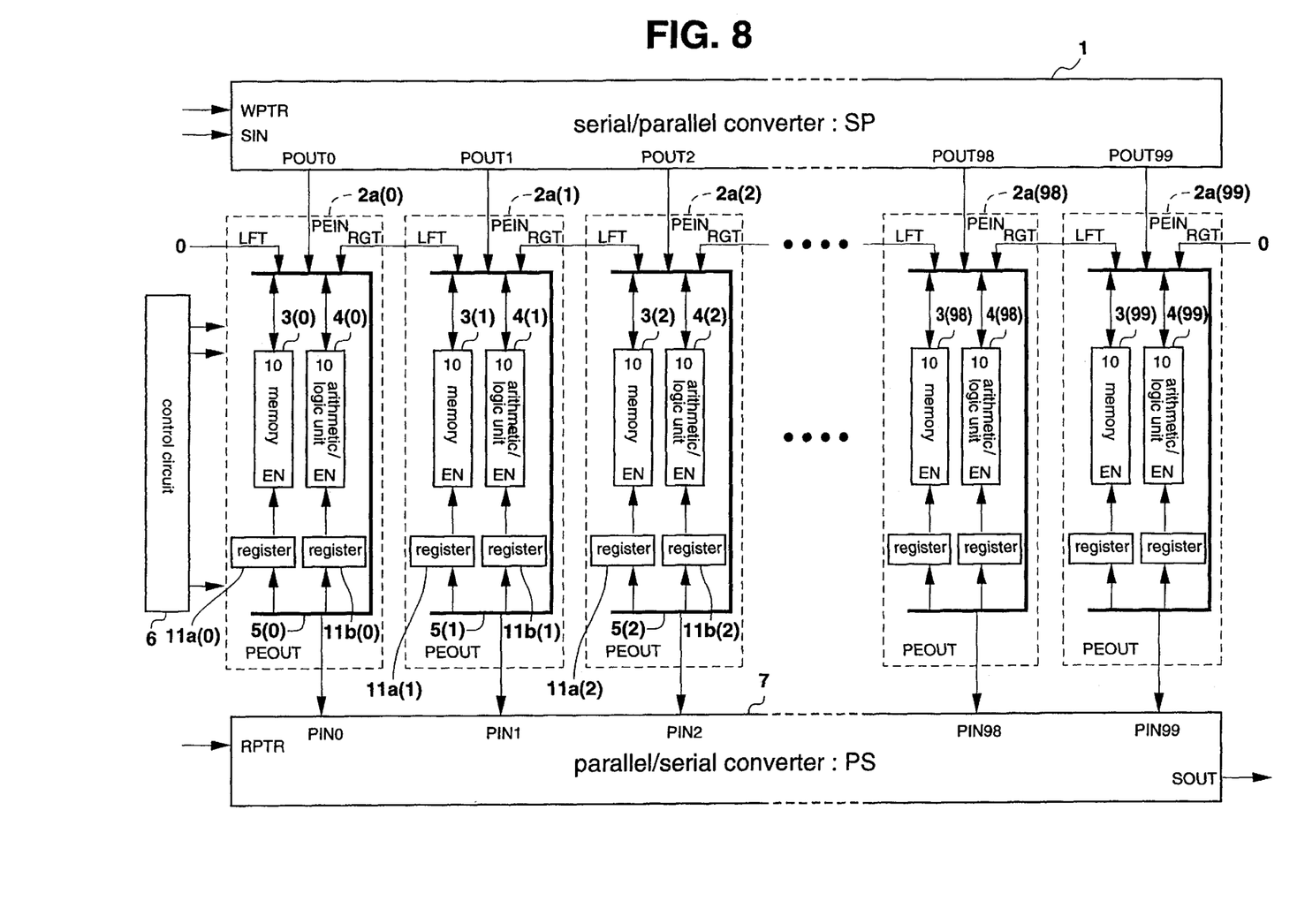
FIG. 8 is a block diagram showing a second embodiment of the parallel processor of the present invention.

Next, a second embodiment of the present invention will be described. FIG. 8 is a block diagram showing the parallel processor according to the second embodiment. As the second embodiment is almost the same as the first embodiment, only differing aspects of the structure will be described. Further, parts which are the same will be given the same numerals and their detailed description will be omitted.

In the first embodiment, a single register 11(i) was provided within each PE 2(i) (i=0 to 99). The output of this register 11(i) was then used as the enable signal for both the memory 3(i) and the ALU 4(i). This meant, however, that the memory 3(i) and the ALU 4(i) could not be put into independent sleep states.

Therefore, a structure is adopted in this second embodiment where two registers, register 11a(i) and register 11b(i) are provided within each PE 2a(i) (i=0 to 99), as shown in FIG. 7. In this way, the output of the register 11a(i) can be used as the enable signal for the memory 3(i) and the output of the register 11b(i) can be used as the enable signal for the ALU 4(i). The memory 3(i) and the ALU 4(i) can therefore be put into sleep states independently. The structure and operation in other regards are the same as for the first embodiment.

In the second embodiment constructed in this way, for example, let the case be considered where PE 2(j) is in an operating state, data is received from the memory 3(j+1) within the neighboring PE 2(j+1) via LFT of PE 2(j+1) and RGT of PE 2(j), and operations are to be carried out on this data by the ALU 4(j) itself. If, at this time, the memory (j+1) of PE 2(j+1) is in a sleep state, the data cannot be brought-in. At this time, the register 11b(j+1) of PE 2(j+1) can be made to output a "1" beforehand, so that the ALU 4(j+1) is put into a sleep state, and the register 11a(i+1) can be made to output a "0" beforehand, so that the memory 3(j+1) is made to go into an operating state.

The sleep states of the memory 3(i) (i=0 to 99) and the ALU 4(i) can therefore be independently controlled, making the parallel processor of the present invention easier to use.

According to the parallel processor of the present invention described above, the controller can control the operating states of the memories and the ALU's. This means that the construction can be simplified, data inputted in parallel can be selectively processed and processing can be carried out in an efficient manner.

What is claimed is:

1. A parallel processor comprising:

a serial/parallel converter including a plurality of data input registers for receiving a plurality of first data composed of serial data and outputting said first data as parallel data;

a plurality of processor elements for performing prescribed arithmetic operations on said first data as parallel data and outputting a plurality of arithmetically-processed second data;

a parallel/serial converter including a plurality of data output registers for receiving said plurality of second data as parallel data and outputting said second data as serial data, wherein each one of said plurality of processor elements is coupled to each one of said data input registers and each one of said output registers in a one-to-one relationship;

control means for jointly controlling operating states of said plurality of processor elements; and instruction signal generating means for generating instruction signals instructing inhibiting of said prescribed arithmetic operations occurring at each of said processor elements for which calculations are unnecessary on the basis of a determination of a range of values in which a respective first data falls, said plurality of processor elements inhibiting prescribed arithmetic operations in accordance with said instruction signals.

2. A parallel processor according to claim 1, wherein each of said plurality of processor elements comprises an arithmetic unit for carrying out said prescribed arithmetic operations, memory means for temporarily storing data before and after arithmetic processing, and register means for storing said instruction signals generated by said instruction signal generating means, and said control means controls reading and writing of information between said arithmetic unit, said memory means and said register means.

3. A parallel processor according to claim 2, wherein said instruction signal generating means generates a first instruction signal for inhibiting the operation of said memory means and a second instruction signal for inhibiting the operation of said arithmetic unit, and said plurality of processor elements are equipped with a first register means for storing said first instruction signals and a second register means for storing said second instruction signal.

4. A parallel processor comprising:

a serial/parallel converter including a plurality of data input registers for receiving a plurality of first data composed of serial data and outputting said first data as parallel data;

a plurality of processor elements for performing prescribed arithmetic operations on said first data as parallel data and outputting a plurality of arithmetically-processed second data, each of said plurality of processing elements comprising an arithmetic unit for carrying out said prescribed arithmetic operations and memory means for temporarily storing data before and after arithmetic processing;

a parallel/serial converter including a plurality of data output registers for receiving said plurality of second data as parallel data and outputting said second data as serial data, wherein each one of said plurality of processor elements is coupled to each one of said data input registers and each one of said output registers in a one-to-one relationship; and control means for jointly controlling operating states of said plurality of processor elements, said control means reading out said data stored in said memory means within said processor elements before arithmetic processing and generating instruction signals instructing inhibiting of operation of each of said processor elements for which calculations are unnecessary on the basis of a determination of a range of values in which a respective first data falls, and said plurality of processor elements inhibiting said prescribed arithmetic processes in accordance with said instruction signals.

5. A parallel processor according to claim 4, wherein each of said plurality of processor elements further comprises register means for storing said generated instruction signals, and said control means controls writing and reading of information between said arithmetic unit, said memory means and said register means.

* * * * *